(12) United States Patent
Hordijk et al.

(10) Patent No.: US 7,946,413 B2
(45) Date of Patent: May 24, 2011

(54) DEVICE FOR CONVEYING ROUND OBJECTS

(75) Inventors: Jan Hordijk, Aalten (NL); Peter Silvester William Ribbers, Beltrum (NL); Jan Willem Pennings, Gendringen (NL)

(73) Assignee: Staalkat International B.V., Aalten (NL)

( * ) Notice: Subject to any disclaimer, the term of this patent is extended or adjusted under 35 U.S.C. 154(b) by 68 days.

(21) Appl. No.: 12/177,505

(22) Filed: Jul. 22, 2008

(65) Prior Publication Data

US 2009/0026044 A1    Jan. 29, 2009

(30) Foreign Application Priority Data

Jul. 24, 2007   (NL) .................................... 1034181

(51) Int. Cl.
*B65G 37/00* (2006.01)

(52) U.S. Cl. .................. 198/400; 198/408; 198/387.02; 198/397.01

(58) Field of Classification Search .................. 198/400, 198/397.02, 397.01, 867.12, 867.11, 610, 198/611
See application file for complete search history.

(56) References Cited

U.S. PATENT DOCUMENTS

| 3,581,891 | A | | 6/1971 | Rysti |
| 3,592,327 | A | * | 7/1971 | Koch et al. ..................... 198/400 |
| 3,964,233 | A | * | 6/1976 | Thomas ......................... 53/446 |
| 4,356,920 | A | | 11/1982 | van der Schoot |
| 5,176,243 | A | * | 1/1993 | Temming et al. ............. 198/400 |

FOREIGN PATENT DOCUMENTS

| NL | 7908406 | 6/1981 |
| NL | 1016852 | 6/2002 |

* cited by examiner

*Primary Examiner* — Gene Crawford
*Assistant Examiner* — Kavel Singh
(74) *Attorney, Agent, or Firm* — Hoffmann & Baron, LLP

(57) ABSTRACT

A conveying device for conveying substantially round objects, such as eggs or fruit.
The conveyor device has a roller conveyor with an endless transport element and successive rows of one or more rollers An object receiving space for receiving an object is delimited by two successive rollers. The roller conveyor has a discharge end where said objects are discharged by falling from said roller conveyor.
The conveyor device furthermore has a second conveyor with an endless element and successive rows of one or more object holders, each object holder having an opening allowing to receive an object therein
The second conveyor has a receiving end which is positioned in line with the discharge end of the roller conveyor so as to receive objects discharged by falling from the roller conveyor in the object holders of the second conveyor.

12 Claims, 2 Drawing Sheets

DEVICE FOR CONVEYING ROUND OBJECTS

CROSS-REFERENCE TO RELATED APPLICATIONS:

This application claims the benefit of Netherlands Application No, NL 1034181, filed Jul. 24, 2007, the contents of which is incorporated by reference herein.

FIELD OF THE INVENTION

The invention relates to a conveying device for conveying substantially round objects, such as eggs or fruit The conveyor device has a roller conveyor with an endless transport element and successive rows of one or more rollers. An object receiving space for receiving an object is delimited by two successive rollers. The roller conveyor has a discharge end where said objects are discharged by falling from said roller conveyor.

The conveyor device furthermore has a second conveyor with an endless element and successive rows of one or more object holders, each object holder having an opening allowing to receive an object therein The second conveyor has a receiving end which is positioned in line with the discharge end of the roller conveyor so as to receive objects discharged by falling from the roller conveyor in the object holders of the second conveyor.

BACKGROUND OF THE INVENTION

A conveying device for eggs is known from NL 1016852. In the case of the known conveying device, eggs on a roller conveyor are supplied to a second conveyor comprising egg cups.

The egg cups are attached with an interval directly to transverse rails which are coupled at both their ends to a revolving chain. The revolving chains are guided over reversing means having a substantially horizontal axis of rotation. On the upper side (conveyance side) of the second conveyor, the egg cups are directed upward with their open side in order to carry an egg; on the underside (return side), the empty egg cups are directed downward with their open side. The eggs are transferred by allowing the eggs to fall at the reversing point of the roller conveyor into the egg cups of the second conveyor, said egg cups then being oriented obliquely at the reversing point of the second conveyor. The eggs fall in this case over a relatively large distance from the roller conveyor into the egg cups, and this entails a risk of breaks in the eggs.

OBJECT OF THE INVENTION

The invention seeks to provide an improved conveying device

SUMMARY OF THE INVENTION

The invention provides a conveying device for conveying substantially round objects, such as eggs or fruit. The conveying device comprises:
  a roller conveyor comprising an endless transport element and a drive for moving the endless transport element in a direction of conveyance, the endless transport element being provided with successive rows of one or more rollers, said rollers being rotatable about an axis transverse to the direction of conveyance, an object receiving space for receiving an object being delimited by two successive rollers, the roller conveyor having a discharge end where said objects are discharged by falling from said roller conveyor;
  a second conveyor comprising an endless element and a drive for moving the endless transport element in a direction of conveyance, the endless transport element being provided with successive rows of one or more object holders, each object holder having an opening allowing to receive an object therein,
  the second conveyor having a receiving end which is positioned in line with the discharge end of the roller conveyor so as to receive objects discharged by falling from the roller conveyor in the object holders of the second conveyor,
  the second conveyor comprising reversing means for the endless element at the receiving end of the second conveyor,
    wherein each object holder of the second conveyor is carried by an arm which extends from the object holder in the direction of conveyance to a fastening member remote from the object holder, which fastening member fastens the arm to the endless element such that on passing of the reversing means at the receiving end the object holders describe an arcuate path with varying orientation of the object holders along said arcuate path allowing the object holders to receive an object discharged by falling from the roller conveyor.

The invention allows the object holders to be moved along an arcuate path in close proximity to the roller conveyor, allowing for a reduced height of fall of the objects, for example eggs. In a particularly advantageous embodiment, the height of fall of the objects can be reduced by approximately 70% when compared to prior art devices.

The object holders can be embodied as cups, e.g egg cups when the device is used for eggs, but can for example also be configured as grippers which can be opened or enlarged to receive a round object and closed or reduced in size to securely grip the object, e.g. a fruit product.

Preferably, the arm comprises a portion extending obliquely backward in the direction of movement This offers the possibility of placing the object holders in close succession on the second conveyor.

The invention will be commented on in greater detail in the subsequent description with reference to the drawings

DETAILED DESCRIPTION OF PREFERRED EMBODIMENTS

Figure 3:
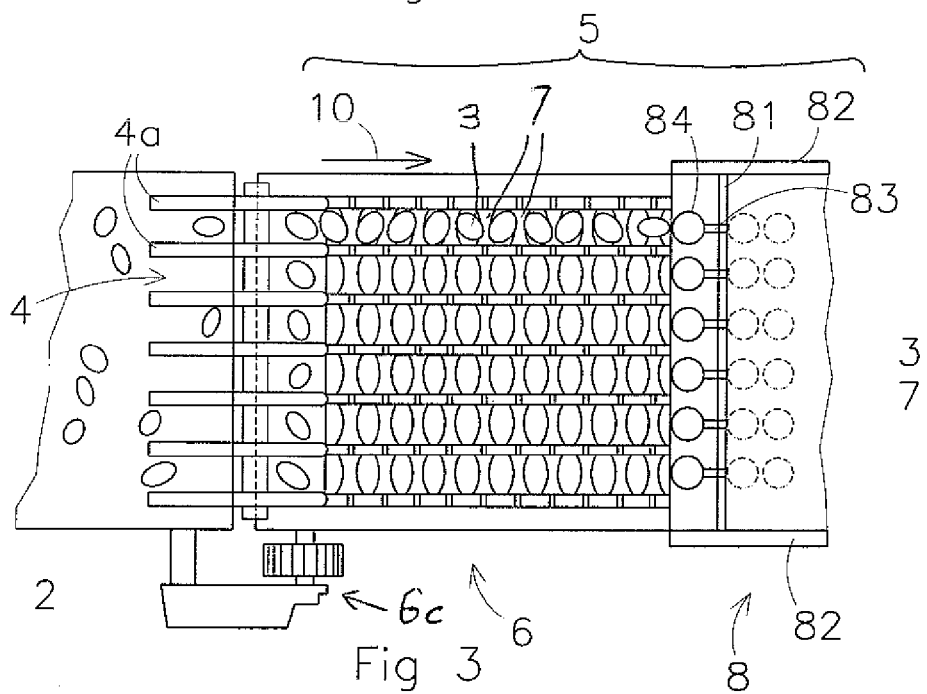
FIG. 3 is a plan view of a portion of a device for packaging eggs comprising a conveying device according to the invention.

FIG. 3 is a plan view of a part of a packaging device 1 for eggs. The packaging device comprises a conveyor belt 2 on which eggs 3 are fed. Positioned at the end of the conveyor belt 2 is assembly with ports 4 and walls 4a. By means of the ports 4 the eggs 3 are placed in rows.

A conveying device 5 comprising a roller conveyor 6 and a second conveyor 8 is arranged behind the ports 4 in the direction of conveyance, which is indicated by arrow 10. The roller conveyor 6 is of a generally known design (an example is e.g. disclosed in NL 1016852) and comprises an endless transport element 6a (e.g. a chain or cable) and a drive 6c (e.g an electric motor) for moving the endless transport element in a direction of conveyance The endless transport element is provided with successive rows of one or more rollers 7, said rollers 7 being rotatable about an axis transverse to the direction of conveyance An egg receiving space for receiving an egg is delimited by two successive rollers 7 The roller conveyor 6 has a discharge end where the objects are discharged by falling from said roller conveyor 6. At said end the endless element 6a with rollers 7 is passed over a reversing means, e.g. a drum or wheel 6b The rollers 7 are arranged in the rows corresponding to the ports 4 The rollers 7 are preferably diabolo-shaped. The rollers 7 are for example cylindrical with at both ends a portion rising frustoconically.

The second conveyor 8 is arranged behind the roller conveyor 6 when seen in the direction of movement 10.

The eggs 3 are transferred during use of the device 1 in the conveying device 5 from the roller conveyor 6 to the second conveyor 8, as will be described in detail hereinafter with reference to FIG. 2.

Figure 2:
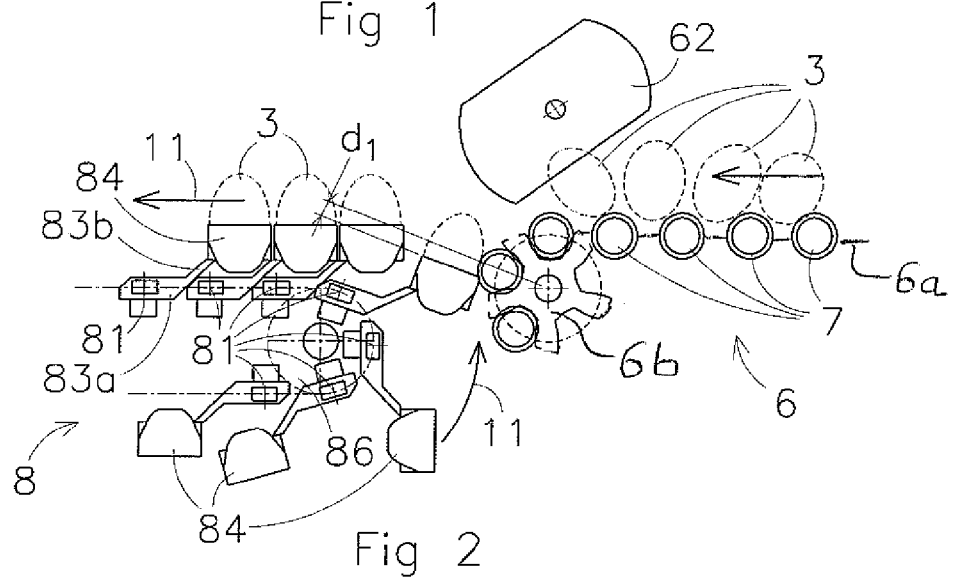
FIG. 2 is a side view of a conveying device according to the invention.

FIG. 2 is a side view of the transfer region between the discharge end of roller conveyor 6 and the receiving end of the second conveyor 8. The second conveyor 8 comprises an endless element which in the case shown comprises two endless chains 82 Rods 81 extend in the transverse direction, the rods 81 each being fastened at their ends to a chain 82 (see FIG. 3). The chains 82 run over reversing wheels 86 or other reversing means The pitch between the rods 81 is in practice often approximately 50 mm (approximately 2 inches).

The arms 83 are each fastened to a rod 81 by a suitable fastening member, e.g. a bolt, at a point of fastening. Fastened at the other end of the arm 83, preferably integral therewith (e.g. the arm and holder being made of plastic) is a cup-shaped egg holder 84 (referred to hereinafter as the cup 84) in which an egg 3 is to be received. On the conveyance side of the second conveyor 8, i.e the top portion, the cups 84 are directed upward with their open side in order to carry an egg. On the return side of the second conveyor, i.e. the bottom portion of the second conveyor 8, the empty cups 84 are directed downward with their open side.

The arms 83 are shaped and attached in such a way that the centre or heart of the cup 84 is located rearward from the point of fastening 85 of the arm to the respective rod 81 when seen in the direction of movement 11 of the second conveyor 8. The arms 83 have in the embodiment shown here a portion 83a extending in the horizontal direction and a portion 83b extending obliquely backward. This shape of the arm has the advantage that the cups 84 are positioned in close succession in the horizontally running portions of the second conveyor 8, as may clearly be seen in FIG. 2. The oblique portion 83b of the arm 83 ensures that the cups 84 are brought to a higher level, as a result of which a cup 84 can be located above a portion 83a of the arm 83 pertaining to the cup 84 located thereafter.

Preferably, when seen in the direction of conveyance, the distance from the point of fastening of the arm 83 to the second conveyor to the centre or heart of the accompanying cup 84 is approximately 0.5 to 1.5 times the distance between two successive points of fastening of object holders to the second conveyor In practice, for a chain having a pitch of approximately 50 mm (2 inches) between the rods 81, the aforementioned distance between the fasting point of the arm 83 and the heart of the accompanying cup 84 will thus be approximately between 25 mm and 75 mm.

Figure 4:
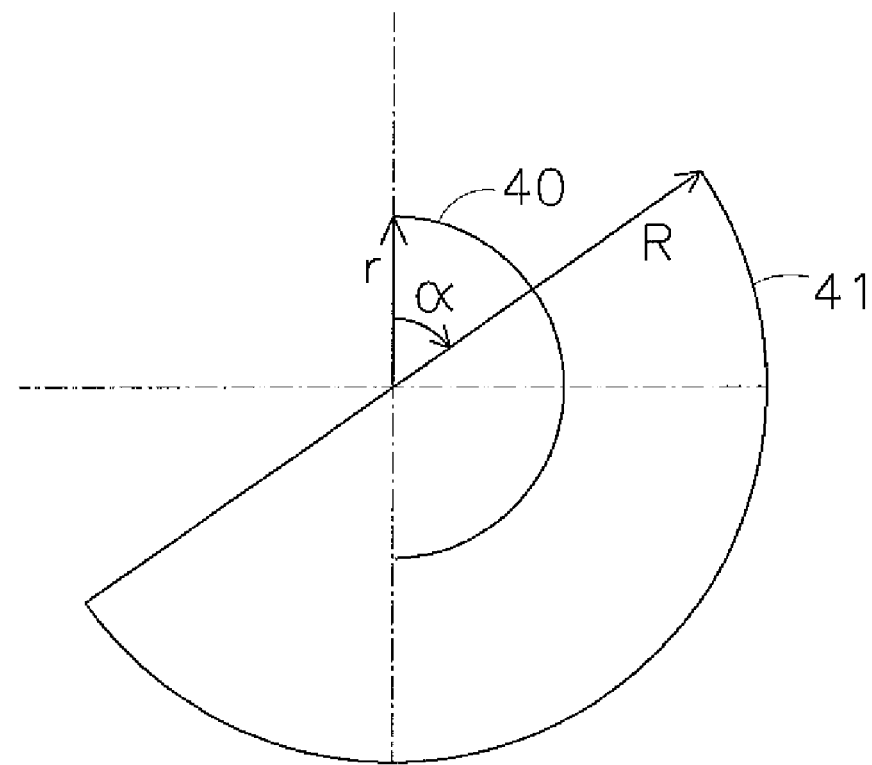
FIG. 4 illustrates the path of movement of object holders of the second conveyor relative to the path of movement of the point of fastening to the conveyor.

At the site of the reversing gear-wheels 86, the fastening members of the arms describe an arc of a circle 40 of 180°, as is illustrated in FIG. 4 The cups 84 also describe an arc of a circle-shaped path 41 around the same centre. The arc of a circle 41 which the cups 84 describe has a larger radius R than the radius r of the circular path 40 which the fastening members describe. In the example shown of FIG. 2, the radius R of the arc of a circle 41 of the cups 84 is approximately twice as large as the radius r of the arc of a circle 40 which the fastening members describe. The arc of a circle 41 which the cups 84 describe is, as a result of the presence of the arms 83, also tilted backward through an angle a relative to the arc of a circle 40 which the fastening points of the arms 83 describe, such as is illustrated in FIG. 4. In the case shown, the angle α is approximately 55° During the passing-through of the arc of a circle-shaped path 41, the position of the cups 84 changes from upside down, i.e. with the open side turned downward, to right way up, i.e with the open side turned upward, such as may clearly be seen in FIG. 2 This is in contrast to, for example, the conveyor which is shown in U.S. Pat. No. 4,356, 920 and in which egg holders are suspended in an articulated manner from a revolving chain and the egg holders have the same position throughout the revolution The design showed according to the invention offers the possibility of moving a cup 84 very close along a roller 7 of the roller conveyor 6 at the moment when an egg falls from the roller conveyor 6 into the cup 84, which cup at that moment stands obliquely. This provides a small height of fall d1 which in a particularly advantageous embodiment can be 70% smaller than the height of fall d2 in the case of a conveying device which is known from NL 1016852 and is represented schematically in FIG. 1.

Figure 1:
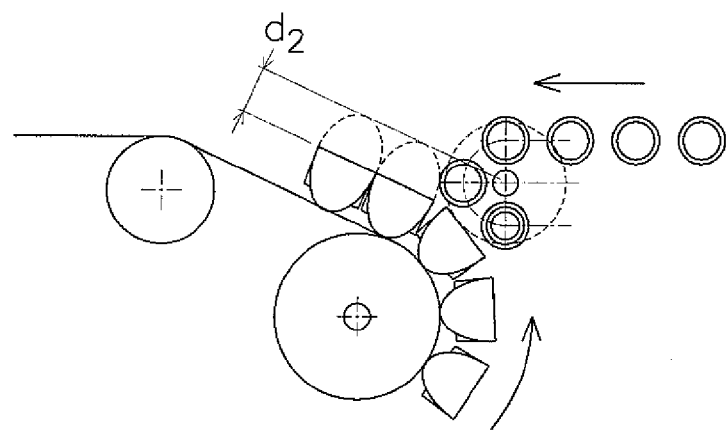
FIG. 1 is a side view of a conveying device as is known from the prior art.

In addition, the design according to the invention allows for the advantage that the cups 84 have a larger mutual distance at the moment when an egg falls into the cup 84 than in the design according to NL 1016852 (FIG. 1). As a result, the invention prevents the falling egg from colliding, as it falls, with the preceding egg and rules out the risk of one of the eggs becoming damaged. In the case of fruit, the items of fruit might become mushy as a result of colliding with one another, so that the invention offers this advantage in this case too.

Preferably, in the direction of movement 11, the distance from the fasting point of the arm 83 to the heart of the accompanying egg cup 84 is at least as great as the radius r of the circular path 40 which the fastening point at the site of the reversing means 86 describes.

In the case of the roller conveyor 6, directing means can be provided to direct the eggs with the point facing forward before they are transferred to the second conveyor 8. The operating principle of the directing means is known per se from NL 1016852. These directing means comprise a star-shaped wheel 61, the points of which project between the rollers 7. An egg 3 is forced to pass either on one edge or on the upper edge of the wheel 61 Furthermore, a ridge plate 62, which forces the egg 3 toward an edge of the roller 7 and forces said egg to move with the point facing forward, can be attached above the rollers. In the case of a device for conveying fruit, these directing means are in fact generally not necessary.

Figure 5:
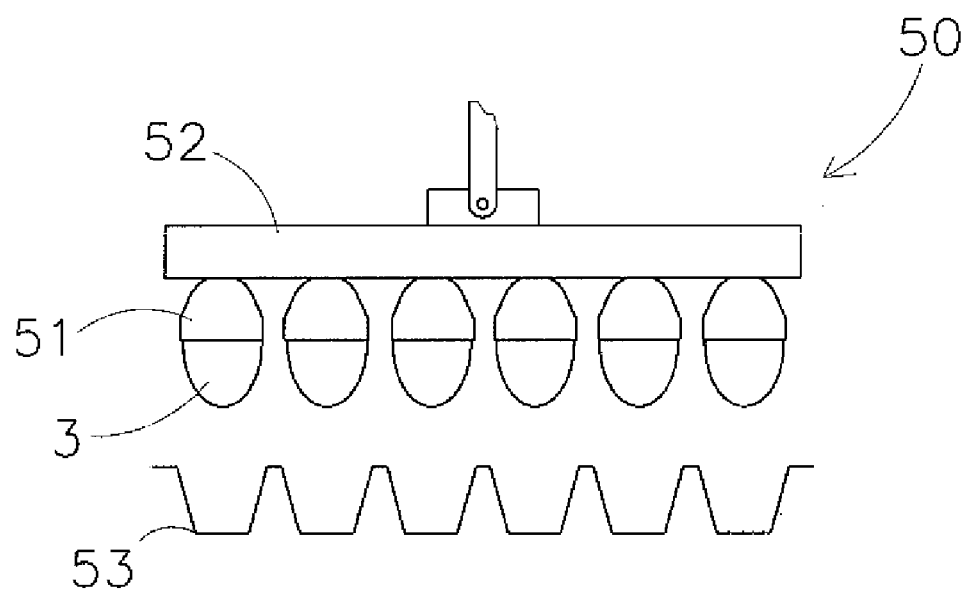
FIG. 5 shows a transfer device for the packaging device of FIG. 3 for placing eggs from the conveying device of FIG. 2 in a packaging.

A transfer device 50 can be positioned behind the second conveyor 8 with suction pads 51 or other gripping elements with which the eggs can be picked up out of the cups 84 in order subsequently to be placed on a tray 53 or a different packaging (see FIG. 5). Optionally, the eggs can also be placed on a further conveyor Preferably, use is made of suction pads 51 with which the eggs 3 are picked up by means of a vacuum which is applied in a suction box 52. Preferably, the egg cups 84 are attached displaceably, viewed in the transverse direction, to the rod 81 in order to be able to reduce the size of the pitch between adjacent egg cups 84 to the pitch of the suction cups or other gripping elements of the transfer device.

In the embodiment shown, the object holders are represented as cup-shaped holders 84. It is however also possible to use grippers as object holders which are opened at the moment when an egg or a fruit is placed swiftly therein from the conveyor 6 which is located somewhat higher and is placed therebefore in the direction of conveyance. At the moment when the egg or the fruit is partially received in the gripper, said gripper can then close and securely grip the egg or the fruit. This would allow the eggs or the fruits to be secured also at the other turning point of the conveyor when they are suspended upside down and for example to be released at a desired point The gripper can for example be configured as a cup comprising segments which can be moved somewhat apart from one another in order to open.

In the exemplary embodiment represented in the figures, the cups 84 describe a circular path 41 on passing of the reversing means. It is however not necessary for the cups 84 to pass through a circular path. A different, for example elliptical, path or a different curve would also be possible.

What is claimed is:

1. A conveying device for conveying substantially round objects, such as eggs or fruit, the conveying device comprising:
   a roller conveyor comprising an endless transport element and a drive for moving the endless transport element in a direction of conveyance, the endless transport element being provided with successive rows of one or more rollers, said rollers being rotatable about an axis transverse to the direction of conveyance, an object receiving space for receiving an object being delimited by two successive rollers, the roller conveyor having a discharge end where said objects are discharged by falling from said roller conveyor;
   a second conveyor having a top portion which constitutes a conveyance side of the second conveyor and a bottom portion which constitutes a return side of the second conveyor, said second conveyor comprising a revolving endless transport element and a drive for moving the endless transport element in a direction of conveyance, the endless transport element being provided with successive rows of one or more object holders, each object holder having an open side allowing to receive an object therein the object holders being arranged such that they are directed upward with their open side when they pass the conveyance side of the second conveyor and are directed downward with their open side when they pass the return side of the second conveyor,
   the second conveyor having a receiving end which is positioned in line with the discharge end of the roller conveyor so as to receive objects discharged by falling from the roller conveyor in the object holders of the second conveyor,
   the second conveyor comprising reversing means via which the endless element of the second conveyor revolves and where the object holders are moved from the conveyance side to the return side and from the return side to the conveyance side respectively,
   wherein each object holder of the second conveyor is carried by an arm, the arm having two ends with one end of the arm being integrally fastened to the object holder, the arm extending from the object holder in the direction of conveyance to a fastening member remote from the object holder, which fastening member fastens the other end of the arm to the endless element such that on passing of the reversing means at the receiving end the object holders describe an arcuate path with varying orientation of the object holders along said arcuate path allowing the object holders to receive an object discharged by falling from the roller conveyor.

2. A conveying device according to claim 1, wherein the object holders are cups.

3. A conveying device according to claim 1, wherein each object holder has a centre, and wherein the distance measured in the direction of conveyance from said centre to the fastening member of the arm is between 0.5 to 1.5 times the distance between two successive fastening members on the endless element of the second conveyor.

4. A conveying device according to claim 1, wherein each object holder has a centre, and wherein the distance measured in the direction of conveyance from said centre to the fastening member of the arm is between 25 mm and 75 mm.

5. A conveying device according to claim 1, wherein the reversing means form a circular path having a radius for the endless element at the receiving end of the second conveyor.

6. A conveying device according to claim 5, wherein each object holder has a centre, and wherein the distance measured in the direction of conveyance from said centre to the fastening member of the arm is at least as great as the radius of the circular path for the endless element.

7. A conveying device according to claim 1, wherein the fastening members of the object holders are adapted to allow for adjustment of the object holders in transverse direction of the second conveyor.

8. A conveying device according to claim 1, wherein the object holders are each adapted to receive an egg.

9. A conveying device according to claim 1, wherein the object holders are each adapted to receive a fruit.

10. A conveying device according to claim 1, wherein the arm comprises a portion extending obliquely backward from the fastening member and also extending obliquely backward from the direction of conveyance of the second conveyor.

11. A conveying device according to claim 1, wherein the object holders move upward toward the discharge end of the roller conveyor with the opening of the object holder facing the discharge end of the roller conveyor.

12. A conveying device for conveying substantially round objects, such as eggs or fruit, the conveying device comprising:
    a roller conveyor comprising an endless transport element and a drive for moving the endless transport element in a direction of conveyance, the endless transport element being provided with successive rows of one or more rollers, said rollers being rotatable about an axis transverse to the direction of conveyance, an object receiving space for receiving an object being delimited by two successive rollers, the roller conveyor having a discharge end where said objects are discharged by falling from said roller conveyor;
    a second conveyor having a top portion which constitutes a conveyance side of the second conveyor and a bottom portion which constitutes a return side of the second conveyor, said second conveyor comprising a revolving endless transport element and a drive for moving the endless transport element in a direction of conveyance, the endless transport element being provided with successive rows of one or more object holders, each object holder having an open side allowing to receive an object therein the object holders being arranged such that they are directed upward with their open side when they pass the conveyance side of the second conveyor and are directed downward with their open side when they sass the return side of the second conveyor, the second conveyor having a receiving end which is positioned in line with the discharge end of the roller conveyor so as to receive objects discharged by failing from the roller conveyor in the object holders of the second conveyor, the second conveyor comprising reversing means via which the endless element of the second conveyor revolves and where the object holders are moved from the conveyance side to the return side and from the return side to the conveyance side respectively, wherein each object holder of the second conveyor is carried by an arm, the arm having two ends with one end of the arm being integrally fastened to the object holder, the arm extending from the object holder in the direction of conveyance to a fastening member remote from the object holder, which fastening member fastens the other end of the arm to the endless element such that on passing of the reversing means at the receiving end the object holders describe an arcuate path with varying orientation of the object holders along said arcuate path allowing the object holders to receive an object discharged by falling from the roller conveyor;

wherein the arm comprises a portion extending obliquely backward from the fastening member and also extending obliquely backward from the direction of conveyance of the second conveyor; and wherein the object holders move upward toward the discharge end of the roller conveyor with the opening of the object holder facing the discharge end of the roller conveyor.

\* \* \* \* \*